US008108425B2

(12) United States Patent
Feng et al.

(10) Patent No.: US 8,108,425 B2
(45) **Date of Patent: *Jan. 31, 2012**

(54) SYSTEM AND METHOD FOR FACILITATING PERSONALIZATION OF APPLICATIONS BASED ON ANTICIPATION OF USERS' INTERESTS

(75) Inventors: Andrew An Feng, Cupertino, CA (US); Joel Pulliam, McLean, VA (US)

(73) Assignee: AOL Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/879,917

(22) Filed: Sep. 10, 2010

(65) Prior Publication Data

US 2010/0332543 A1 Dec. 30, 2010

Related U.S. Application Data

(63) Continuation of application No. 11/010,238, filed on Dec. 9, 2004, now Pat. No. 7,797,338.

(51) Int. Cl.
*G06F 17/30* (2006.01)

(52) U.S. Cl. ........................................ 707/781; 707/804

(58) Field of Classification Search .................. 707/781, 707/804

See application file for complete search history.

(56) References Cited

U.S. PATENT DOCUMENTS 5,758,257 A 5/1998 Herz et al.
6,014,638 A 1/2000 Burge et al.
6,020,883 A 2/2000 Herz et al.
6,029,195 A 2/2000 Herz
6,088,722 A 7/2000 Herz et al.
6,253,188 B1 6/2001 Witek et al.
6,345,288 B1 2/2002 Reed et al.
6,389,469 B1 5/2002 Vekslar et al.
6,412,012 B1 6/2002 Bieganski et al.
6,429,879 B1 8/2002 Sturgeon et al.
6,519,571 B1 2/2003 Guheen et al.
6,609,096 B1 8/2003 De Bonet et al.
6,640,238 B1 10/2003 Bowman-Amuah
6,640,242 B1 10/2003 O'neal
6,640,249 B1 10/2003 Bowman-Amuah
6,654,735 B1 * 11/2003 Eichstaedt et al. ............ 707/749

(Continued)

FOREIGN PATENT DOCUMENTS

EP 0 910088 A2 * 4/1999

(Continued)

OTHER PUBLICATIONS

Peiling, W.; "Beyond Topical Relevance: Document Selective Behavior of Real Users IR Systems"; Proceedings of 56th Annual Meeting; Integrating Technologies/Converging Professions, Oct. 24-28, 1993; Pub: Learned Inf.: xvii+334, USA.

(Continued)

*Primary Examiner* — Son T Hoang
(74) *Attorney, Agent, or Firm* — Michael A. Glenn; Glenn Patent Group

(57) ABSTRACT

Embodiments for facilitating personalization of applications based on anticipation of users' interests are provided. In one preferred embodiment, a communication session is established with a user. Data related to user activities conducted by the user are collected during the communication session. Finally, collected data are processed according to one or more predetermined rules to obtain anticipated interests data used in personalization of applications for the user and the anticipated interests data are further stored in a user database.

12 Claims, 10 Drawing Sheets

U.S. PATENT DOCUMENTS

| | | | | |
|---|---|---|---|---|
| 2002/0012035 | A1 | 1/2002 | Mouri et al. | |
| 2002/0026356 | A1 | 2/2002 | Bergh et al. | |
| 2002/0026459 | A1 | 2/2002 | Fernandez | |
| 2002/0065836 | A1 | 5/2002 | Sasaki | |
| 2002/0065936 | A1 | 5/2002 | Schiuma | |
| 2002/0073088 | A1 | 6/2002 | Beckman et al. | |
| 2002/0092026 | A1* | 7/2002 | Janniello et al. | 725/86 |
| 2002/0111832 | A1 | 8/2002 | Judge | |
| 2002/0129367 | A1 | 9/2002 | Devara | |
| 2002/0198991 | A1 | 12/2002 | Gopalakrishnan et al. | |
| 2003/0028498 | A1 | 2/2003 | Hayes-Roth | |
| 2003/0050916 | A1* | 3/2003 | Ortega et al. | 707/1 |
| 2003/0055901 | A1 | 3/2003 | Smith, Jr. et al. | |
| 2003/0058277 | A1 | 3/2003 | Bowman-Amuah | |
| 2003/0067554 | A1 | 4/2003 | Klarfeld et al. | |
| 2003/0093790 | A1 | 5/2003 | Logan et al. | |
| 2003/0093792 | A1 | 5/2003 | Labeeb | |
| 2003/0101449 | A1* | 5/2003 | Bentolila et al. | 725/10 |
| 2003/0110501 | A1 | 6/2003 | Rafey et al. | |
| 2003/0112280 | A1 | 6/2003 | Driskell | |
| 2003/0131142 | A1 | 7/2003 | Horvitz et al. | |
| 2003/0167234 | A1 | 9/2003 | Bodmer et al. | |
| 2003/0172378 | A1 | 9/2003 | Lalitha et al. | |
| 2003/0191816 | A1 | 10/2003 | Landress et al. | |
| 2003/0225614 | A1* | 12/2003 | Rodriguez et al. | 705/14 |
| 2003/0227487 | A1 | 12/2003 | Hugh | |
| 2004/0003096 | A1 | 1/2004 | Willis | |
| 2004/0012576 | A1* | 1/2004 | Cazier | 345/204 |
| 2004/0133649 | A1* | 7/2004 | Kim | 709/207 |
| 2005/0203884 | A1 | 9/2005 | Allen et al. | |

FOREIGN PATENT DOCUMENTS

| | | | |
|---|---|---|---|
| EP | 1 093070 | A2 * | 4/2001 |
| EP | 1 093070 | A3 * | 3/2003 |
| EP | 0 796538 | B1 * | 6/2003 |

OTHER PUBLICATIONS

Gervasio, M.T.; "Adaptive Mixed-Initiative Systems for Decision-Theoretic Crisis Response"; Interactive and Mixed-Initiative Decision-Theoretic Systems (TS SS-98-03) Proceedings of 1998 Spring Symposium Series Interactive and Mixed-Initiative decision-theretic Systems; p. 53-4; Mar. 23-25, 1998, Pub. AAAI press vii+151.

Bramley, M.; "Data-Based Axis Determination"; C/C++ Users journal, Pub. Miller Freeman, 2000 USA.

Price, J.; "The Audience of One: Making Professional Communication Personal"; IPCC 2001; Communications Dimensions; Proceedings IEEE international Professional Communication Conference; p. 199-204; Oct. 24-27, 2001 pub. IEEE; xi+469 pp. 2001 USA.

Xu, M., et al.: "Using Autonomous Agents to Make Recommendation in a Modeling Market": Proceedings of 2002 International Conference on Machine Learning and Cybernetics; vol. 3; p. 1322-5; Nov. 4-5, 2002, Pub. IEEE x+iv+2255 pp.; 2002 USA.

Montaner, M.; et al.; "Improving Case Representation and Case Base Maintenance in Recommender Agents"; Advances in Case-Based Reasoning; 6th European Conference; ECCBR 2002; Proceedings; Lecture Notes in Artificial Intelligence; vol. 2416; p. 234-48; Sep. 4-7, 2002, USA.

Liu, F.: et al. An Architecture of Wireless Web and Dialogue System Convergence for Multimodal Service Interaction Over Converged Networks: Proceedings 27th Annual International Computer Software and Applications Conference: p. 513-18, Nov. 3-6, 2003: Pub: IEEE Comput. Soc.; xviii+710 pp.; 2003 USA.

Marshall, C., et al.; Spatial Hypertext: Designing for Change: Communications of the ACM, vol. 38, No. 8; p. 88; Aug. 1995 USA.*

Froese, K., et al.; The Effect of Client Caching on File Server Workloads; Dept. of Computer Science; University of Saskatchewan, Canada; Proceedings of the 29$^{th}$ Annual Hawaii International Conference on System Sciences—1996.*

Casasola, E., et al. "Intelligent information Agents for the World Wide Web"; Information and Telecommunication Technology Center; 1997 USA.*

Armstrong, R., et al; "Webwatcher: A ILarning Apprentice for the World Wide Web"; School of Computer Science; Carnegie Mellon University, Mar. 1997, USA.*

Pazzani, M., et al; "Learning and Revising User Profiles: The Identification of Interesting Web Sites"; Machine Learning 27; p. 313-331; 1997, The Netherlands.*

Vetschera, R.; "The Value of Preference Information in Agency Relationships"; International Institute for Applied Systems Analysis; Dec. 1998, Austria.*

Nasraoui, O.; et al. "Extracting Web User Profiles Using Relational Competitive Fuzzy Clustering"; International Journal on Artificial Intelligence Tools, 2000 USA.

Godoy, D.; et al.; "Personal Searcher: An Intelligent Agent for Searching Web Pages"; ISISTAN Research Institute; Universidad National del Centro de la Prov. de Buenos Aires; 2000, Argentina.

Chen, C, et al.; "PVA: A Self-Adaptive Personal View Agent System"; Taiwan, 2001.

Nasraoui, O., et al.; "An Intelligent Web Recommendation Engine Based on Fuzzy Approximate Reasoning"; Dept of Electrical Engineering, University of Memphis, USA, 2003.

Sakagami, H. et al.; "Learning Personal Preferences on Online Newspaper Articles From User Behaviors"; C&C Research Laboratories; NEC Corporation; Japan, 1997.

* cited by examiner

900

{NEW | EDIT}RULE

Define Rule                                                    Step 1 of 2

If the Rule matches the following Preference, Location, or Feed criteria it will be evaluated as TRUE

901

Location is: [                                                          ]

[Add criteria...... ▽]  [ Add ]  Click 🗑 to delete a criteria

| This Rule will be TRUE if any of these locations or feeds are visited. | This Rule will be FALSE if any of these locations or feeds are visited. |
|---|---|
| 903 | 903 |
| at least: [ 2 ] time(s) | less than: [ 1 ] time(s) |
| per: [ week ▽ ] —904 | per: [ month ▽ ] —904 |
| in the past: [ 1 ] [month(s)▽] —905 | in the past: [ 3 ] [month(s)▽] —905 |
|  | AND if any Preferences in this Rule is also FALSE |

Evaluation Dates

This rule is evaluated every day or the year
Exit Evaluation Dates

[ Next> ]                                              [ Cancel ]

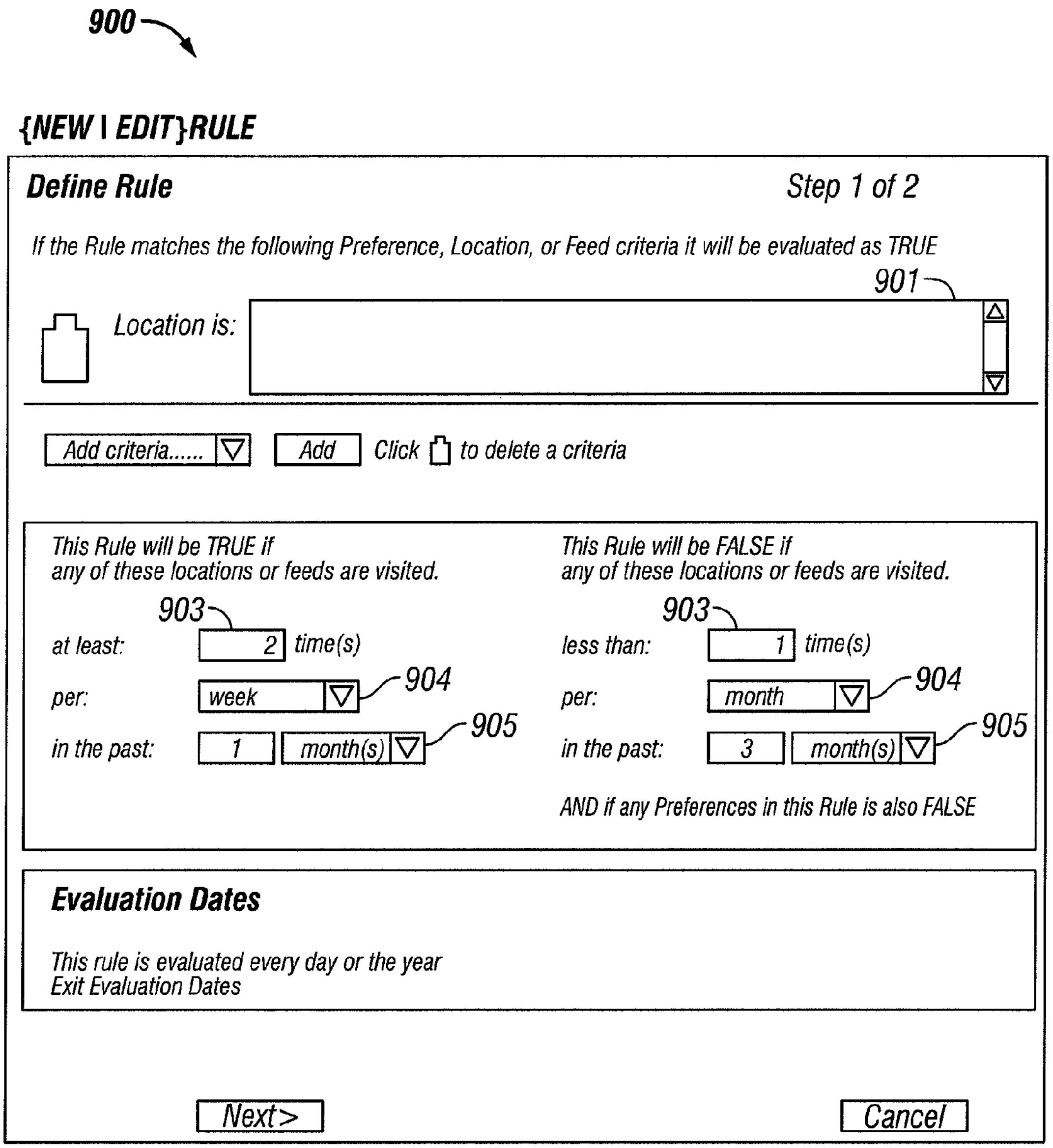

{NEW | EDIT}RULE                                                921

Define Rule                                          Step 1 of 2

*If the Rule matches the following Preference, Location, or Feed criteria it will be evaluated as TRUE*

📄 Preferences: [_____922_____] [Browse....]

[is ▽]

- ⦿ true
- ○ this many value:  [  1  ]
- ○ these values        [_____△▽] [Values....]

---

[Add criteria...... ▽] [ Add ]  Click 📄 to delete a criteria

Evaluation Dates

This rule is evaluated every day or the year
Exit Evaluation Dates

[Next>]                                              [Cancel]

SYSTEM AND METHOD FOR FACILITATING PERSONALIZATION OF APPLICATIONS BASED ON ANTICIPATION OF USERS' INTERESTS

CROSS-REFERENCE TO RELATED APPLICATIONS

This application is a continuation of U.S. patent application Ser. No. 11/010,238, filed Dec. 9, 2004 now U.S. Pat. No. 7,797,338, which is incorporated herein in its entirety by this reference thereto.

TECHNICAL FIELD

The invention relates generally to the field of network-based communications and, more particularly, to a system and method for facilitating personalization of applications based on anticipation of users' interests over a network, such as the Internet.

BACKGROUND OF THE INVENTION

The explosive growth of the Internet as a publication and interactive communication platform has created an electronic environment that is changing the way business is transacted and the way entertainment is perceived. As the Internet becomes increasingly accessible around the world, communications among users increase exponentially and efficient navigation of the information becomes essential.

Several attempts have been made to facilitate such efficient navigation of the Internet, namely to provide some degree of customization for easy interaction and navigation. Existing web portals enable such customized applications, but only appear to customize such applications based on the purchasing history of users (e.g., Amazon.com) or when users take specific and elaborate step-by-step actions to personalize their experience (e.g., my.yahoo.com). However, there is a need for an elaborate and sophisticated system and method to facilitate systematic personalization of applications without significant user input.

SUMMARY OF THE INVENTION

A system and method for facilitating personalization of applications based on anticipation of users' interests are described. In one preferred embodiment, a communication session is established with a user. Data related to user activities conducted by the user is collected during the communication session. Finally, collected data is processed according to one or more predetermined rules to obtain anticipated interests data used in personalization of applications for the user and the anticipated interests data is further stored in a user database.

BRIEF DESCRIPTION OF THE DRAWINGS

FIGS. 9A and 9B illustrate exemplary human user interfaces to define program rules to be stored within the personalization server entity.

DETAILED DESCRIPTION

Figure 1:
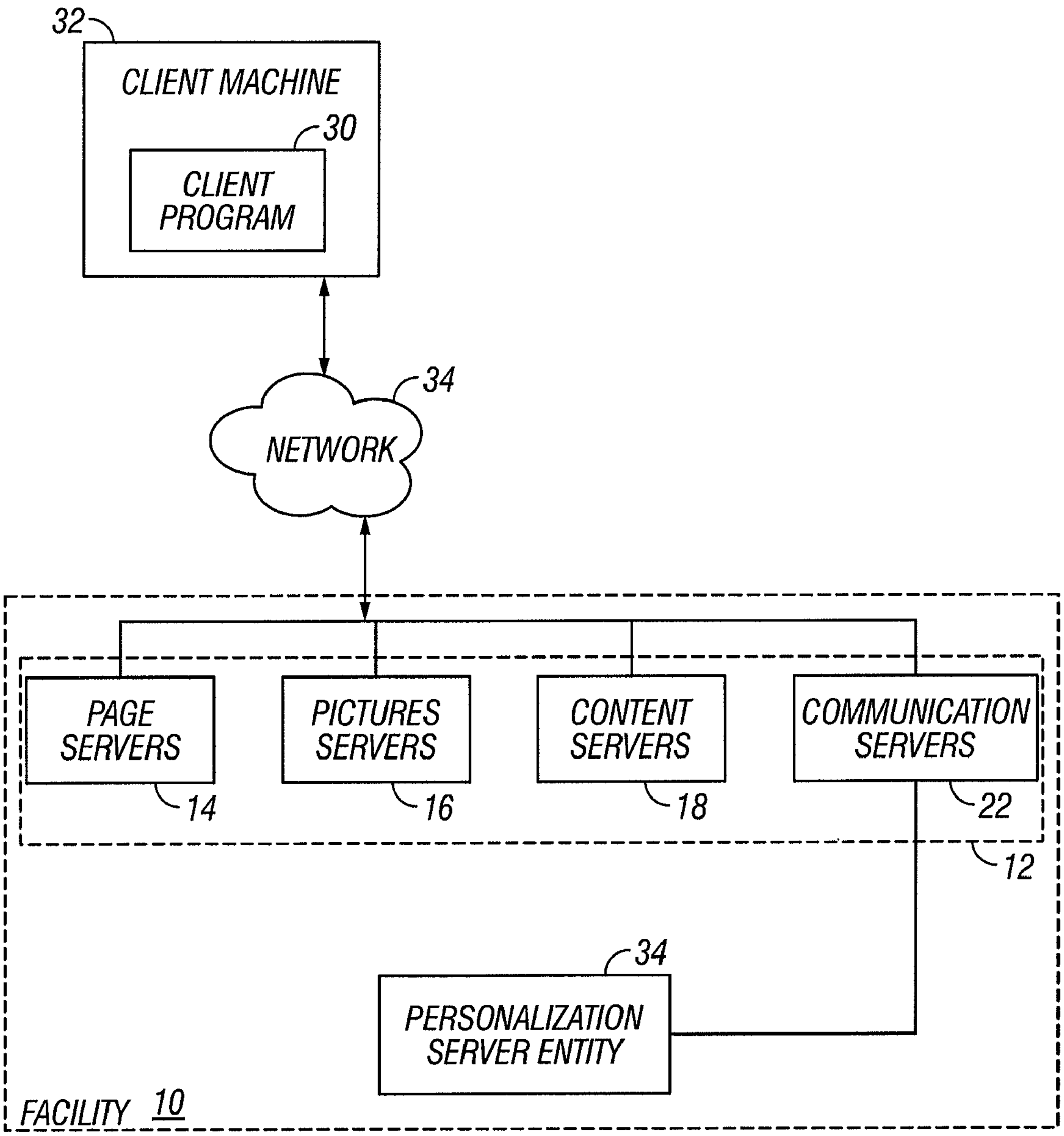
FIG. 1 is a block diagram illustrating an exemplary network-based transaction and communications facility, which includes a personalization server entity for facilitating personalization of applications based on anticipation of users' interests, according to one embodiment of the invention.

FIG. 1 is a block diagram illustrating an exemplary network-based transaction and communications facility 10, which facilitates personalization of applications based on anticipation of users' interests. While an exemplary embodiment of the invention is described within the context of a network transaction and communications facility, it will be appreciated by those skilled in the art that the invention will find application in many different types of computer-based, and network-based, facilities.

The facility 10 includes one or more of a number of types of front-end web servers 12, such as, for example, web page servers 14, which deliver web pages to multiple users, picture servers 16, which deliver images to be displayed within the web pages, and content servers 18 (for example, multimedia content servers), which dynamically deliver content information (audio and video data) to the users. In addition, the facility 10 may include communication servers 22 that provide, inter alia, automated real-time communications, such as, for example, instant messaging (IM) functionality, to/from users of the facility 10, and automated electronic mail (email) communications to/from users.

The facility 10 further includes one or more back-end servers, such as a personalization server entity 24 for facilitating personalization of applications based on anticipation of users' interests, as described in further detail below, and other known back-end servers configured to enable functionality of the facility 10. The network-based facility 10 may be accessed by a client program 30, such as a browser, e.g. the Internet Explorer browser distributed by Microsoft Corporation of Redmond, Wash., that executes on a client machine 32 and accesses the facility 10 via a network 34, such as, for example, the Internet. Other examples of networks that a client may utilize to access the facility 10 includes a wide area network (WAN), a local area network (LAN), a wireless network, e.g. a cellular network, the Plain Old Telephone Service (POTS) network, or other known networks.

Figure 2:
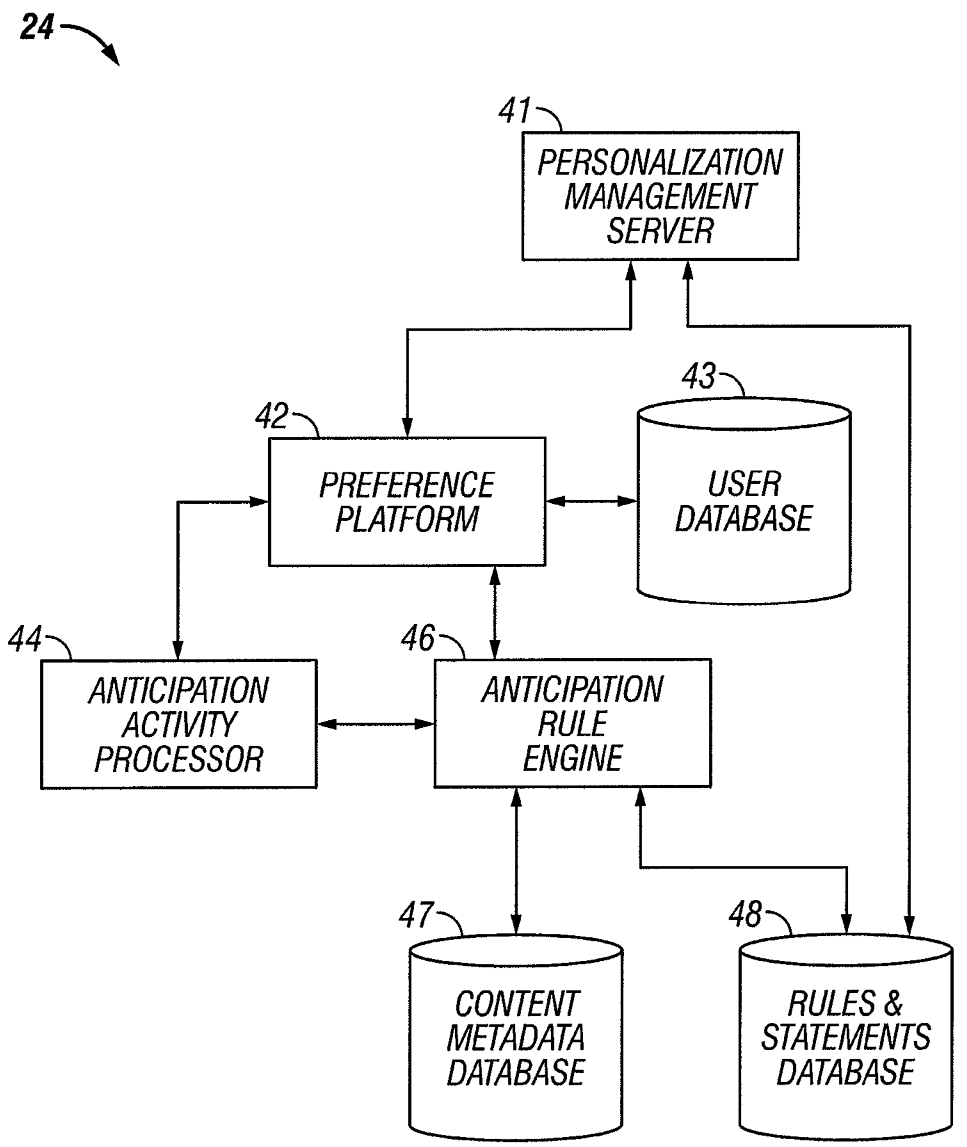
FIG. 2 is a block diagram illustrating a personalization server entity within the network-based server facility according to one embodiment of the invention.

FIG. 2 is a block diagram illustrating a personalization server entity within the network-based server facility according to one embodiment of the invention. As illustrated in FIG. 2, in one embodiment, the personalization server entity 24 includes a personalization management server 41 for enabling activity data collection and for enabling input of program rules and statements, as described in further detail below. The personalization management server 41 is coupled to a rules and statements database 48, which may, in one embodiment, be implemented as a relational database, and which contains the program rules and statements input by program editors through the personalization management server 41. In an alternative embodiment, the database 48 may be implemented as a collection of objects in an object-oriented database.

In one embodiment, the personalization server entity 24 further includes an anticipation activity processor 44 and an anticipation rule engine 46 coupled to the anticipation activity processor 44 and further coupled to a content metadata database 47. The anticipation activity processor 44 is a hardware and/or software module for collecting activity data related to each user. The anticipation rule engine 46 is a hardware and/or software module for receiving the collected activity data and for processing the data using program rules and statements stored in the rules and statements database 48. The content metadata database 47 may, in one embodiment, be implemented as a relational database, or may, in an alternate embodiment, be implemented as a collection of objects in an object-oriented database. The content metadata database 47 stores metadata associated with content sources accessed by the user, such as, for example, content feeds that generate web addresses accessed by the user, the metadata being used in identification of the corresponding addresses.

Finally, the personalization server entity 24 includes a preference platform 42 coupled to a user database 43 and further coupled to each of the previously described modules, the personalization management server 41, the anticipation activity processor 44, and the anticipation rule engine 46. The preference platform 42 is a software and/or hardware module for enabling creation of personalized applications based on users' interests, as described in further detail below.

Figure 3:
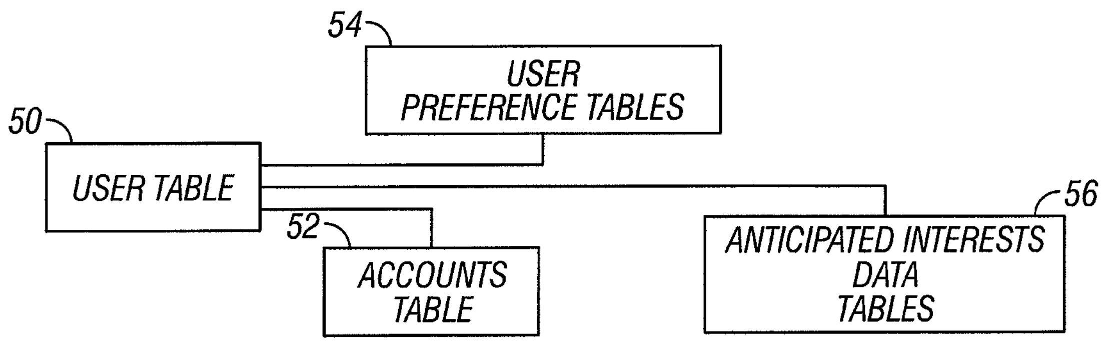
FIG. 3 is a block diagram illustrating a database, maintained by and accessed via a personalization platform within the personalization server entity, which at least partially implements and supports the personalization server entity according to one embodiment of the invention.

FIG. 3 is a block diagram illustrating a database, maintained by and accessed via the personalization platform 42 within the personalization entity 24, which at least partially implements and supports the personalization entity 24 according to one embodiment of the invention. As illustrated in FIG. 3, the user database 43 may, in one embodiment, be implemented as a relational database, and includes a number of tables having entries, or records, that are linked by indices and keys. In an alternative embodiment, the database 43 may be implemented as a collection of objects in an object-oriented database.

Central to the database 43 shown in FIG. 3 is a user table 50, which contains records for each entity or user of the facility 10. The database 23 also includes an accounts table 52, which may be linked to the user table 50 and may be populated with account information related to each user of the network-based facility 10.

The database 43 may include a number of other tables, which may also be linked to the user table 50, for example, tables specifically provided to enable an exemplary embodiment of the present invention. One or more user preferences tables 54 are configured to store preferences and/or selections explicitly specified by the user, part of a user profile constructed and stored for each user, such as, for example, content preferences, web site and/or web page preferences, and other preferences that may be stored by users of the facility 10. In one embodiment, each user has continuous access to the user profile and may modify at anytime the user preferences stored in the user preferences tables 54.

One or more anticipated interests data tables 56 are configured to store another portion of each user profile, which includes processed activity data, such as, for example, data collected from activities performed by each user and further processed to include anticipated interests of the users and to enable personalization of applications subsequently presented to the specific user.

In one embodiment, each instance of stored activity data includes a switch, which is set by a program rule provided by program editors via the personalization management server 41, and which can be turned state ON or OFF to indicate anticipated interest by the user in a particular area or content source. Each program rule contains one or more parameters that set the state for a particular switch. In one embodiment, rules may include a list of targets indicating traffic in a particular interest area, a predetermined time period to turn the switch on or off, a frequency count within the time period to turn the switch on or off, and a repetition of the predetermined time period, as described in further detail below.

Figure 4:
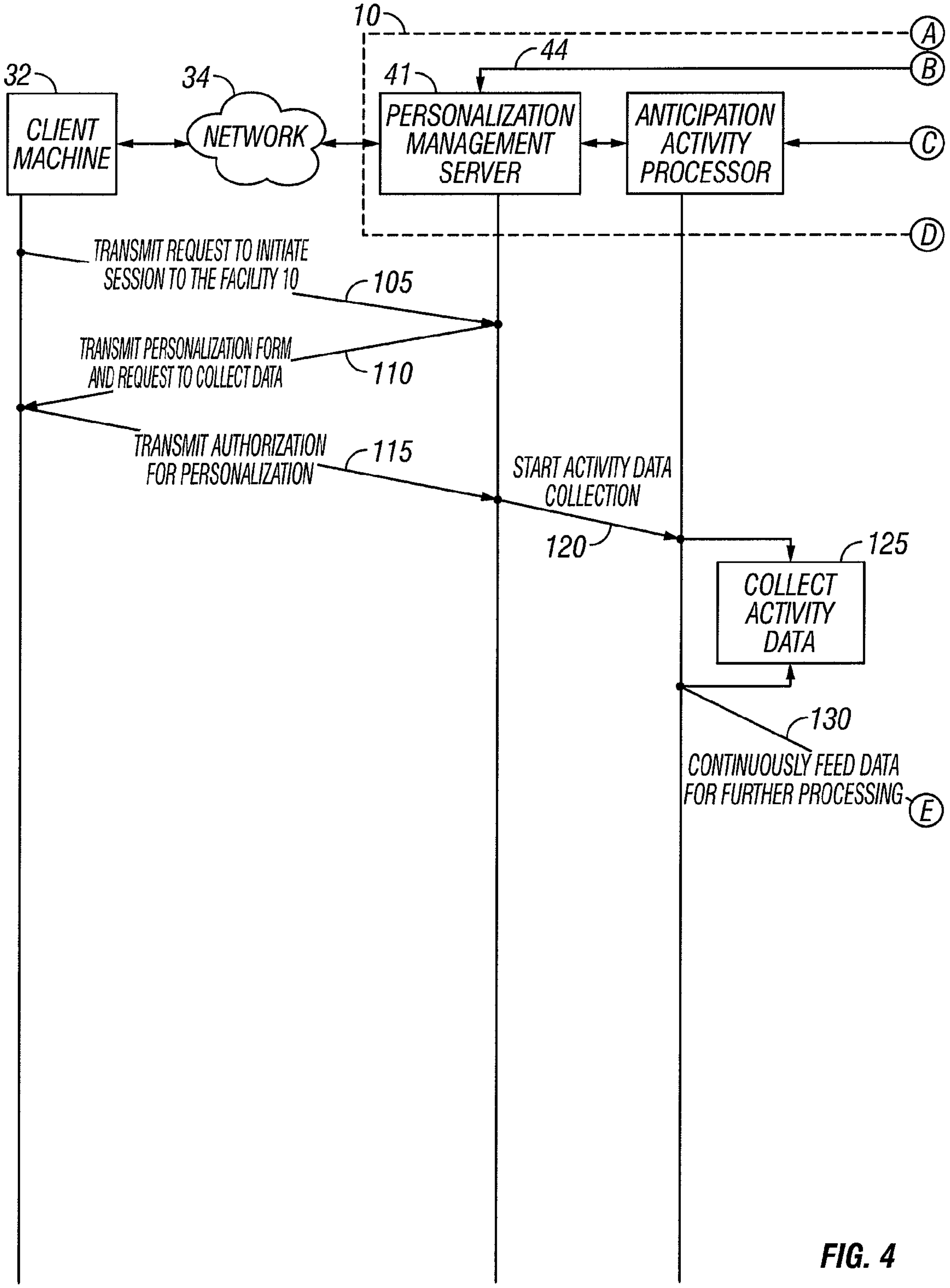
FIG. 4 is an interaction diagram illustrating a sequence of interactions for facilitating personalization of applications based on anticipation of users' interests, according to one embodiment of the invention.
Figure 4:
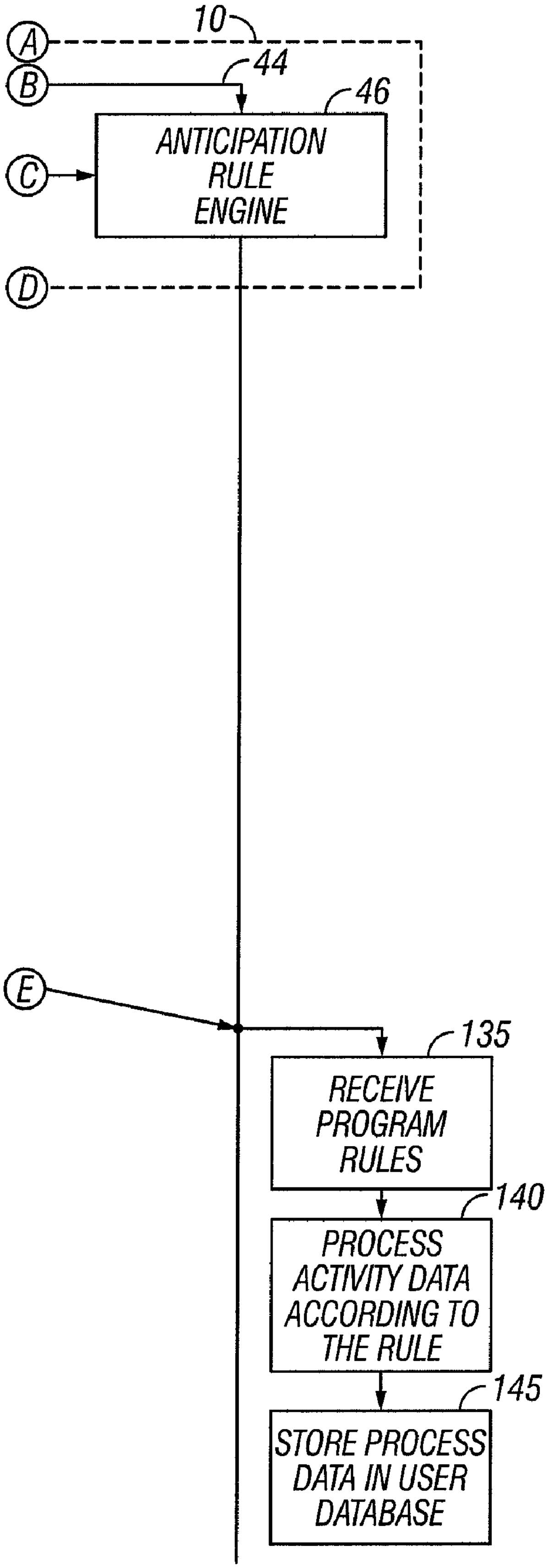

FIG. 4 is an interaction diagram illustrating a sequence of interactions 100 for facilitating personalization of applications based on anticipation of users' interests, according to one embodiment of the invention. As illustrated in FIG. 4, in one embodiment, the sequence 100 commences at block 105 with a request from the client machine 32 to access the facility 10 and to initiate a communication session with the user. The facility 10 receives the request via communication servers 22 and forwards the request to the personalization management server 41.

In one embodiment, if an authorization to collect data is needed from the user, at block 110, the personalization management server 41 transmits a personalization form to the user via one or more of the front-end servers 14-22. The personalization management server 41 displays the personalization form in a message window of a user interface area within the client machine 32 and requests authorization to collect activity data. Alternatively, if no authorization is needed, data is collected and processed automatically while the user is in session, and the user may be allowed to access the facility 10 and opt-out of data collection at anytime.

At block 115, if the user authorizes collection of activity data, for example via a conventional mouse click command in the message window of the user interface area, the client machine 32 transmits the authorization to collect activity data to the personalization management server 41 via the communication servers 22.

At block 120, the session is established and the personalization management server 41 communicates with the anticipation activity processor 44 within the personalization entity 24 and prompts the processor 44 to start collection of activity data.

At block 125, in one embodiment, the anticipation activity processor 44 continuously collects raw data of user activities, such as, for example, types of activities conducted by the user, the dates and times of such activities, content sources accessed by the user, clickstream events representing web pages visited by the user, transactions performed by the user, and other information related to activities performed by the user during the session. If a user accesses a content source via the client machine 32 and the network 34, such as, for example, a newspaper web page, then accesses a calendar of activities, and, subsequently, accesses an electronic mail account, the anticipation activity processor 44 collects such activity data and the date and time of access for further processing and storage. The processed activity data will then be used to develop the user's profile stored in the user database 43. In one embodiment, the anticipation activity processor 44 filters out predetermined user activities that cannot be stored during the access session for policy and other reasons or requirements, such as, for example, predetermined URLs, directories, domain or subdomain addresses.

At block 130, in one embodiment, the anticipation activity processor 44 communicates with the anticipation rule engine 46 within the personalization entity 24 and continuously transmits the collected activity data to the anticipation rule engine 46 for further processing.

At block 135, the anticipation rule engine 46 retrieves predetermined program rules and statements stored in the rules and statements database 48 and further retrieves metadata associated with the specific program rules from the content metadata database 47.

In one embodiment, the program rules are used to set the switches within the user database 43. As described above, each program rule includes one or more parameters, such as, for example, the list of target parameters indicating traffic in a particular interest area, the predetermined time period parameter to turn the switch on or off, the frequency count parameter within the time period to turn the switch on or off, and the repetition parameter indicating a repetition of the predetermined time period.

Figure 9B:
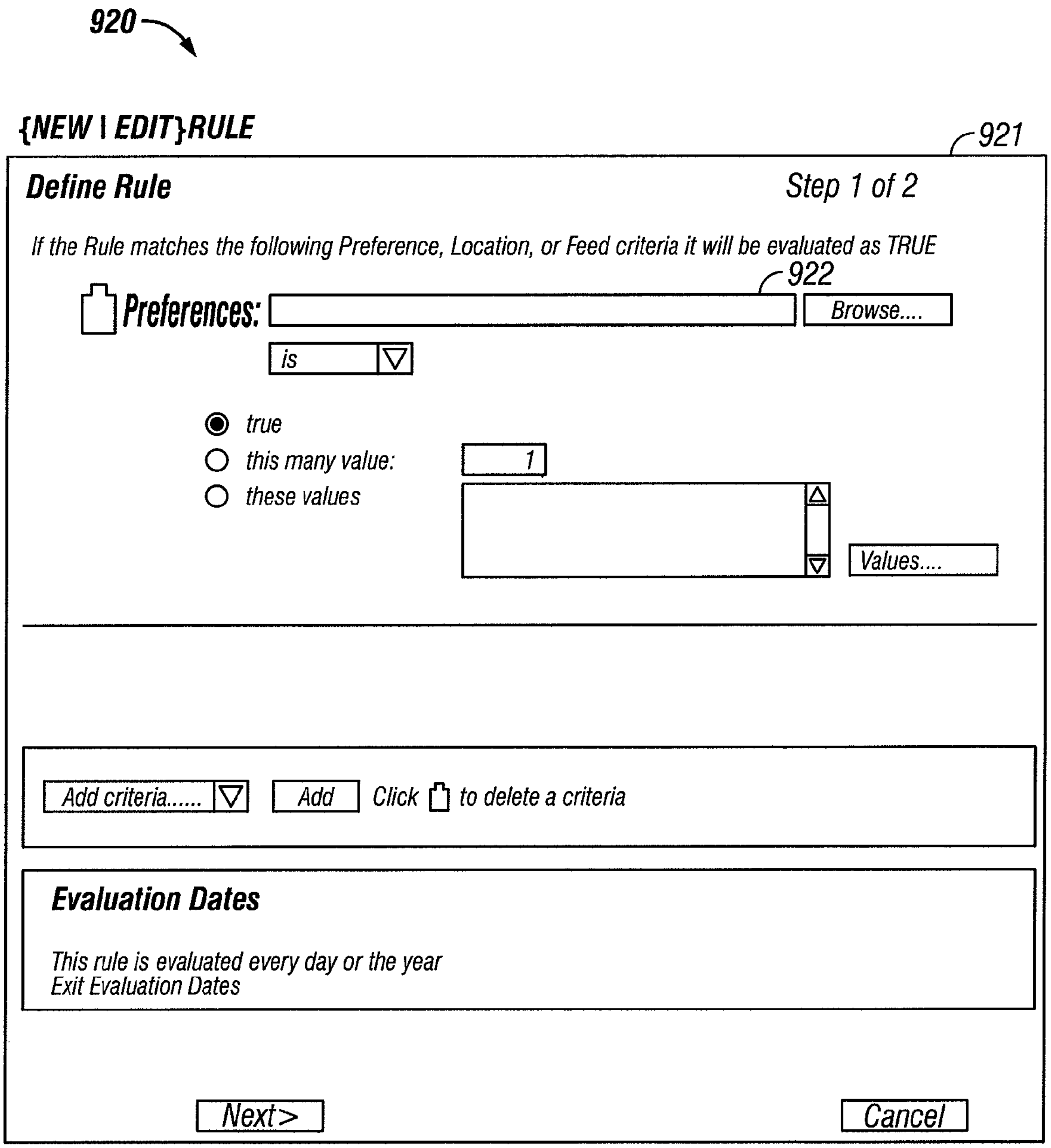

FIGS. 9A and 9B illustrate exemplary human interfaces to define program rules to be stored within the personalization server entity. As illustrated in FIG. 9A, the personalization management server 41 presents a human interface 900 to program editors and enables the program editors to define the parameters of each program rule.

The human interface 900 includes a location window 901 and a parameter window 902 and facilitates creation and editing of each program rule. The location window 901 enables a program editor to enter one or more target locations to be monitored by the corresponding program rule.

Target parameters monitored by the particular rule include addresses, such as, for example, URL patterns, click tracking, such as, for example, clicks on a particular link or form submitted by the user, short-term addresses, such as, for example, addresses generated by the content feeds, and user preferences that can be used to trigger a program rule. To account for the feed-based addresses, the program rule monitors activity data on article-level content by associating metadata received from the content feeds with the corresponding dynamic URLs in order to derive the meaning of the particular URLs.

In one embodiment, the parameter window 902 enables the program editor to set a frequency count parameter in one or more frequency fields 903, a time period parameter in one or more time period fields 904, such as, for example, drop-down menus illustrating the range in which the frequency count parameter works, and a repetition parameter in one or more repetition fields 905, such as, for example, drop-down menus illustrating various repetition intervals.

Once a target parameter is defined, the frequency count parameter on the target must be set. The frequency count parameter can be set as low as a single instance within a predetermined period of time, or as frequently as it is deemed necessary by the program editors. The frequency count parameter must be accompanied by the time period parameter and the repetition parameter. The time period parameter defines the range in which the frequency count works, for example, daily, weekly, or monthly. The repetition parameter defines how often a rule can repeat within a set cycle, for example within a 30-day cycle, and can be set individually for both switch settings of a program rule.

As illustrated in FIG. 9B, in an alternate embodiment, the personalization management server 41 presents a human interface 920 to the program editors. The user interface 920 includes a user-specified preference window 921 and facilitates input of preference information within a preference field 922.

At block 140, in one embodiment, the anticipation rule engine 46 processes the collected activity data according to program rules and statements stored in the rule and statements database 48. The anticipation rule engine 46 analyzes the activity data based on the retrieved program rules and sets the associated switches accordingly. In one embodiment, if the target parameter within the rule is configured to monitor content within a number of pages of a content source, or any feed-based article tagged as containing that content, and if the user accesses the content source repeatedly, the anticipation rule engine 46 sets the switch indicating interest for the particular content to ON.

Finally, at block 145, the processed activity data is then transmitted to the user database 43 and stored within the anticipated interests data tables 56 of the database 43. In one embodiment, the anticipation rule engine 46 transmits the activity data and the associated switches to the user database 43 for storage and subsequent use by the preference platform 42.

Figure 5:
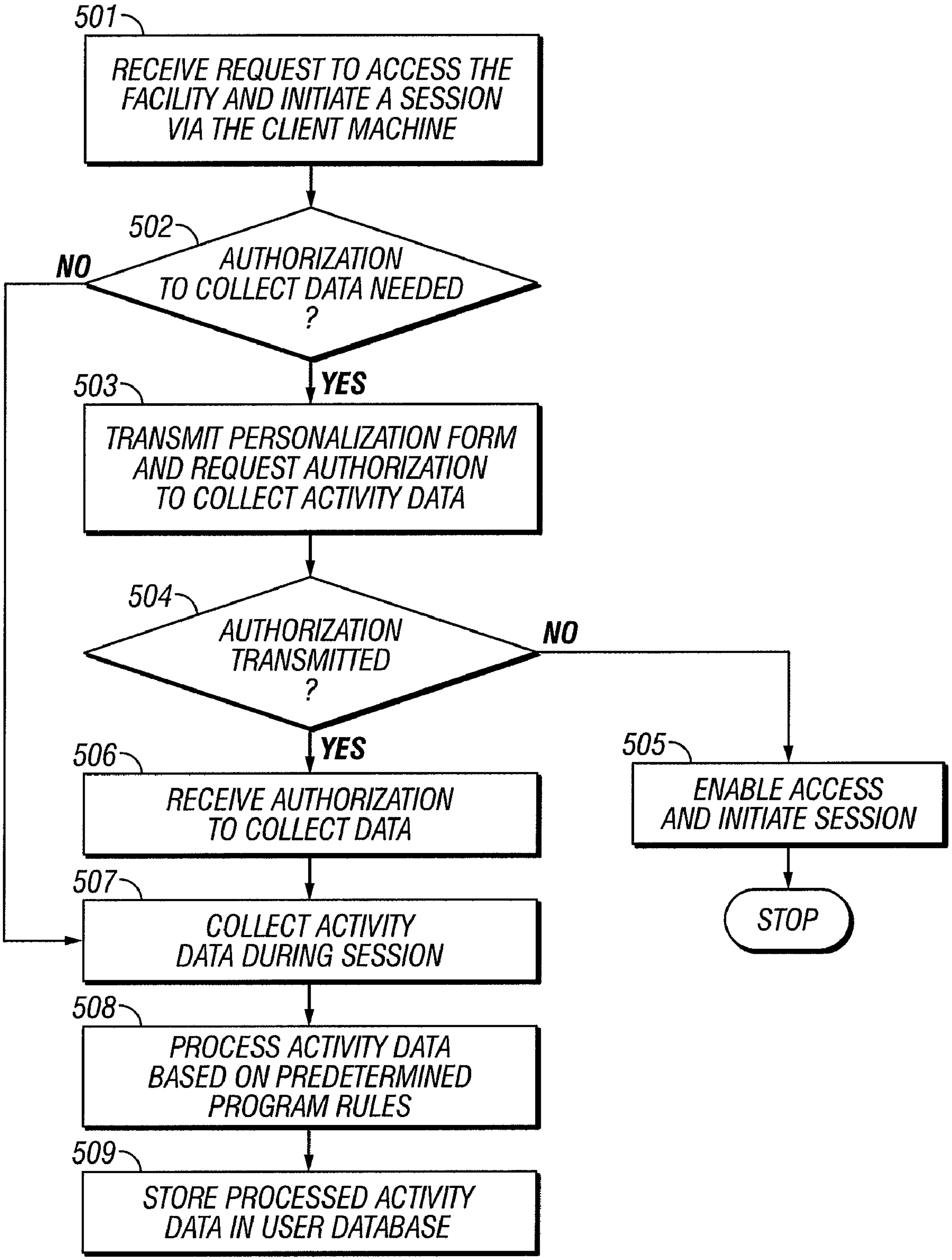
FIG. 5 is a flow diagram illustrating a method for collecting activity data in preparation for personalization of applications based on anticipation of users' interests, according to one embodiment of the invention.

FIG. 5 is a flow diagram illustrating a method for collecting activity data in preparation for personalization of applications based on anticipation of users' interests, according to one embodiment of the invention. As illustrated in FIG. 5, at processing block 501, a request to access the facility and to initiate a session is received from a user via a client machine.

At processing block 502, a decision is made whether an authorization to collect activity data is needed from the user. If the user needs to authorize the data collection, at processing block 503, a personalization form requesting authorization to collect data is transmitted to the user. Otherwise, if no authorization is needed, the procedure jumps to processing block 507.

Next, at processing block 504, a decision is made if the authorization has been transmitted. If no authorization is transmitted, at processing block 505, user access is enabled, a communication session is initiated, and the procedure stops. Otherwise, if the user accesses the personalization form and authorizes collection of activity data, at processing block 506, the authorization is received from the user.

At processing block 507, activity data performed by the user is collected during the session. At processing block 508, the activity data is processed based on predetermined program rules and statements. Finally, at processing block 509, the processed activity data is stored in corresponding tables within the user database 43.

Figure 6:
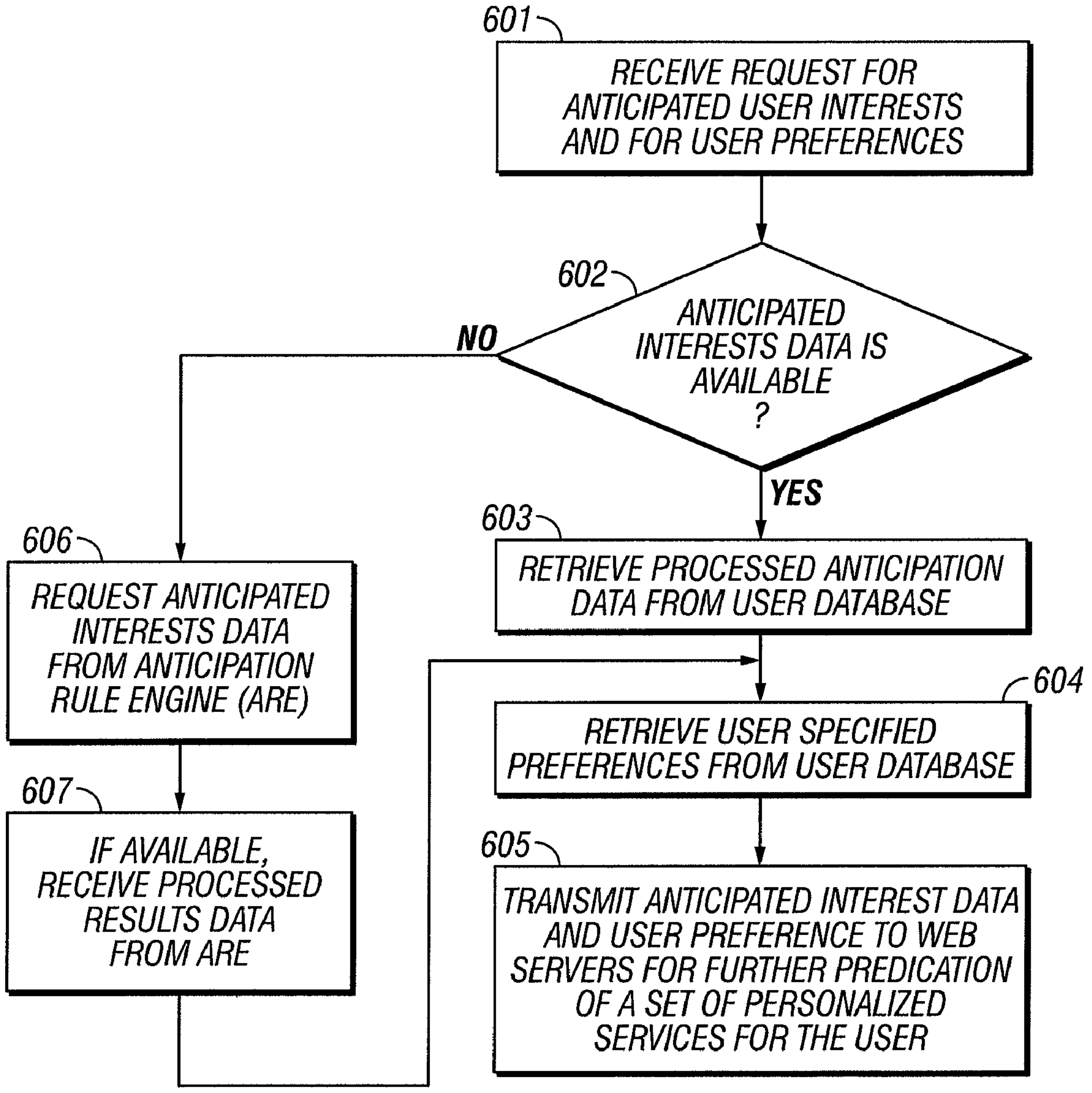
FIG. 6 is a flow diagram illustrating a method for facilitating personalization of applications based on users' interests, according to o ne embodiment of the invention.

FIG. 6 is a flow diagram illustrating a method for facilitating personalization of applications based on users' interests, according to one embodiment of the invention. As illustrated in FIG. 6, at processing block 601, a request for anticipated user interests and for user-specified preferences is received. In one embodiment, the preference platform 42 receives a request from one or more of the front-end web servers 12 to provide user interests, including anticipated user interests stored within the data tables 56 and/or user-specified preferences stored within the user preferences tables 54 of the user database 43.

At processing block 602, a decision is made whether anticipated interests data is available for the particular user within the database 43. In one embodiment, the preference platform 42 searches the user table 50 and the account tables 52 for user account and profile information and further searches the user preferences tables 54 and the anticipated interests data tables 56 to determine whether the corresponding tables 54, 56 contain any information related to the specific user, such as, for example, preferences explicitly specified and stored by the user and/or switches generated and stored by the anticipation rule engine 46.

If anticipated interests data associated with the user is available, at processing block 603, the processed anticipation data is retrieved from the user database 43. In one embodiment, the preference platform 42 retrieves the areas of anticipated interest associated with the ON switches stored within the database 43. Otherwise, if anticipated interests data is not available, at processing block 606, a request to provide anticipated interests data is transmitted to the anticipation rule engine 46. In one embodiment, the preference platform 42 communicates with the anticipation rule engine 46 and requests real-time activity data continuously fed to the anticipation rule engine 46 via the anticipation activity processor 44. At processing block 607, the anticipation rule engine 46 processes any available activity data and transmits the processed results data to the preference platform 42. The procedure then jumps to processing block 604.

At processing block 604, preferences explicitly specified by the user are further retrieved from the user database 43. In one embodiment, the preference platform 42 retrieves any user preferences stored within the user preferences tables 54.

Finally, at processing block 605, the preference platform 42 communicates with the front-end web servers 12 and transmits the retrieved anticipated interests data and user-specified preferences for further predication of a set of personalized services to be displayed for the user in a user interface area within the client program 30. In one embodiment, the web servers 12 use the information transmitted by the preference platform 42, such as for example, information related to content sources accessed by the user, various applications accessed by the user, clickstream events, and other user-related activities, to create a personalized user interface area containing one or more content windows, each window including access to an entity preferred by the user.

In an alternate embodiment, the user profile may be used to present information automatically to the user at the time the user connects to the network 34. The user performs one or more tasks, such as, for example, accessing a web page to read an online newspaper, accessing a calendaring application to check the calendar, and accessing an electronic mail account to read email messages.

The personalization server entity 24 presents the user with an automated display for accessing the respective content sources identified as routine in the user profile. In one embodiment, the user automatically advances through the routine tasks outlined above. For example, the user may be automatically presented with the web page of the online newspaper. After a predetermined amount of time has passed, the calendaring application may be launched, followed by the electronic mail account. Depending on the complexity of the user's calendar, the email account may be displayed after the user has had a chance to review the items on the calendar. For example, if the calendar includes no entries, then the email account may be displayed shortly after the launch of the calendaring application. If the calendar contains multiple entries, the email account may be displayed after a predetermined period of time, calculated to enable the user to review all the entries.

In one embodiment, the order of the presentation is flexible and may be changed based on event importance. For example, when an email message has been received with high importance, the electronic mail account may be displayed prior to the accessing of the web page of the online newspaper. In another embodiment, the user is enabled to configure the presentation of tasks identified as routine, by accessing the facility 10 and specifying user preferences to be stored in the user preferences tables 54. For example, the user may specify the time spent performing an activity before the next task is presented.

Figure 7:
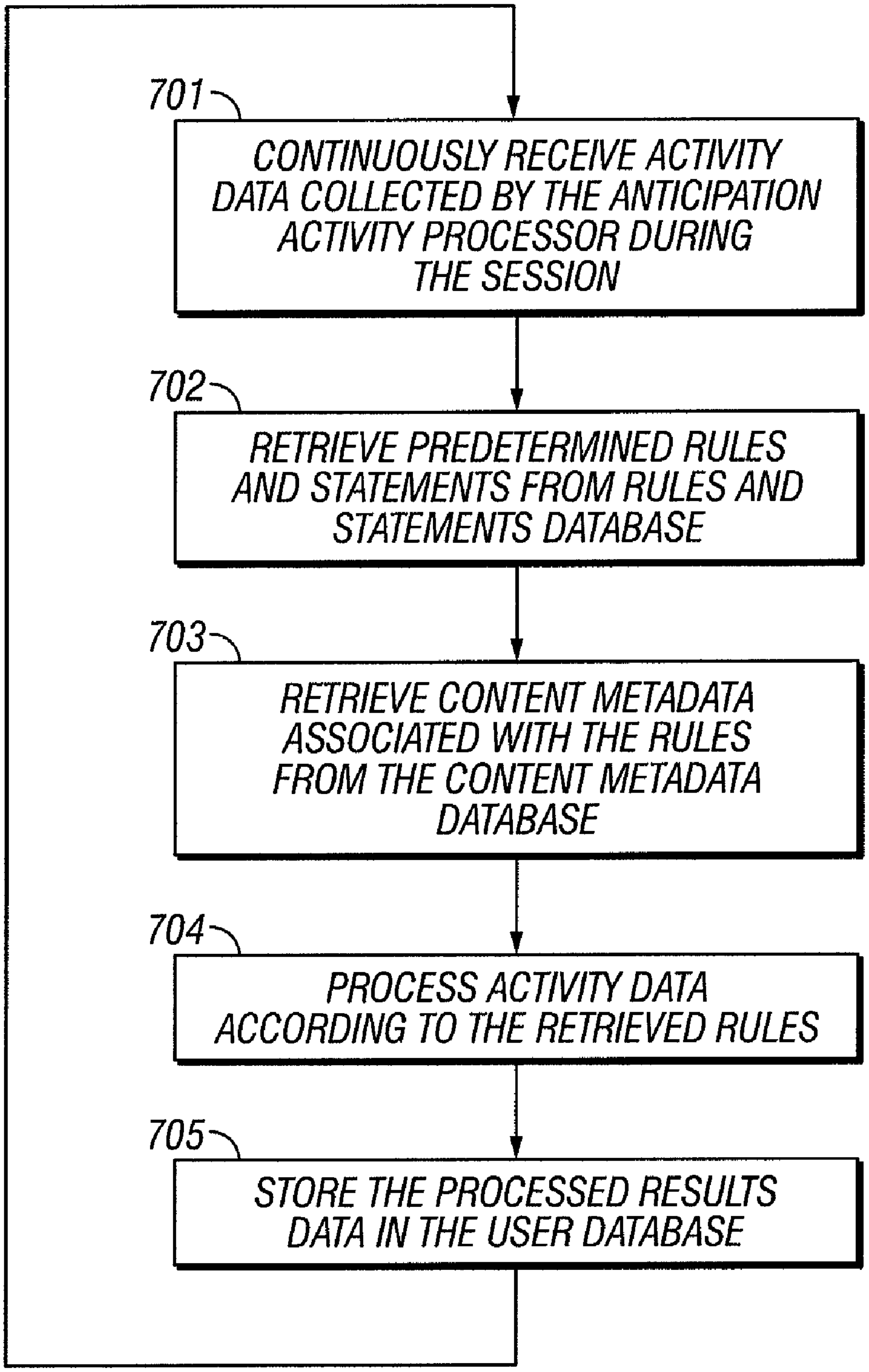
FIG. 7 is a flow diagram illustrating a method for processing activity data, according to one embodiment of the invention.

FIG. 7 is a flow diagram illustrating a method for processing activity data, according to one embodiment of the invention. As illustrated in FIG. 7, at processing block 701, activity data collected by the anticipation activity processor 44 during the communication session is continuously received.

At processing block 702, predetermined rules and statements are retrieved from the rules and statements database 48. At processing block 703, metadata associated with the rules is retrieved from the content metadata database 47.

At processing block 704, the received activity data is processed according to the retrieved program rules. Finally, at processing block 705, the processed results data is stored in the user database 43.

Figure 8:
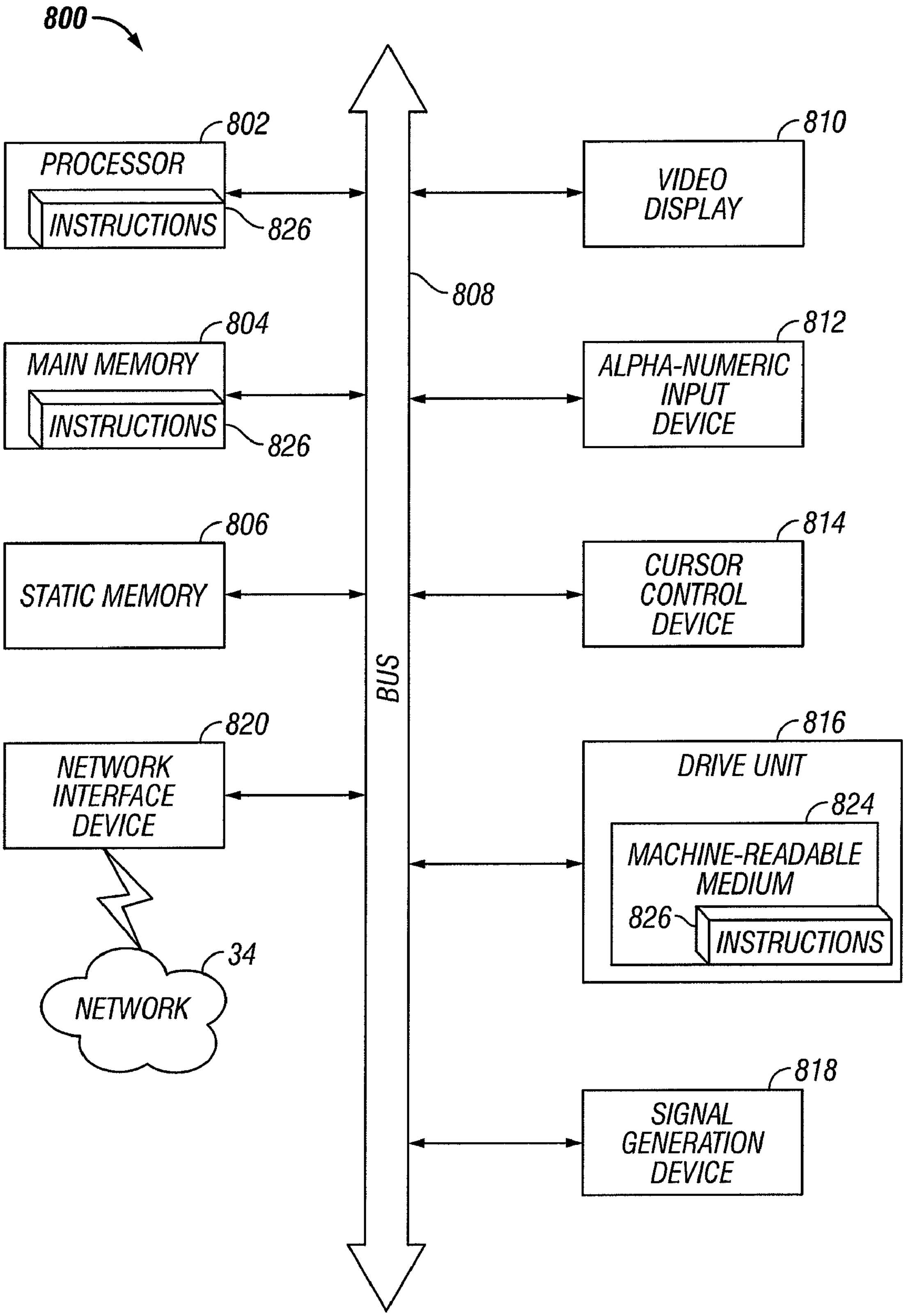
FIG. 8 is a diagrammatic representation of a machine in the exemplary form of a computer system within which a set of instructions may be executed.

FIG. 8 shows a diagrammatic representation of a machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810, e.g. a liquid crystal display (LCD) or a cathode ray tube (CRT). The computer system 800 also includes an alphanumeric input device 812, e.g, a keyboard, a cursor control device 814, e.g. a mouse, a disk drive unit 816, a signal generation device 818, e.g. a speaker, and a network interface device 820.

The disk drive unit 816 includes a machine-readable medium 824 on which is stored a set of instructions, i.e. software, 826 embodying any one, or all, of the methodologies described above. The software 826 is also shown to reside, completely or at least partially, within the main memory 804 and/or within the processor 802. The software 826 may further be transmitted or received via the network interface device 820.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method comprising steps of:

establishing, by a session processor, a communication session with a user;

collecting data, by an activities processor, related to user activities conducted by the user during the communication session; and processing, by a data processor, the data according to at least one predetermined rule to obtain anticipated interests data used in personalization of applications for the user;

wherein the user activities comprise using a calendar application and using an e-mail account and wherein when the calendar application includes no entries, then the e-mail account is displayed shortly after launching the calendar application and when the calendar application contains multiple entries, then the e-mail account is displayed after a predetermined period of time, calculated to enable the user to review all of the multiple entries.

2. The method according to claim 1, further comprising steps of:

storing the anticipated interests data in a user database.

3. The method according to claim 1, wherein the establishing step further comprises steps of:

receiving, by a receiving processor, a request to initiate the communication session from the user;

when authorization to collect the data is required, transmitting, by a transmitting processor, a personalization form to the user in a message window of an interface area, the personalization form enabling the user to authorize collection of the data; and receiving the authorization to collect the data from the user through the message window of the interface area.

4. The method according to claim 1, wherein the collecting step further comprises steps of:

analyzing, by an analyzing processor, the collected data; and filtering out, by a filtering processor, predetermined user activities performed by the user during the communication session based on predetermined policy requirements.

5. The method according to claim 1, wherein the collected data further comprise any of types of the user activities, dates and times of the user activities, content sources accessed by the user during the communication session, clickstream events representing web pages visited by the user during the communication session, and transactions performed by the user during the communication session.

6. The method according to claim 1, wherein the processing step further comprises steps of:

retrieving, by a receiving processor, the at least one predetermined rule from a rules database;

retrieving, by a retrieving processor, metadata associated with the at least one predetermined rule from a content metadata database; and applying, by an applying processor, the at least one predetermined rule to the collected data.

7. The method according to claim 6, wherein the at least one predetermined rule further comprises at least one parameter used to set a state of at least one switch within a user database, each switch being associated with an instance of the anticipated interests data and indicating an anticipated interest by the user in a particular interest area or content source.

8. The method according to claim 7, wherein the at least one parameter further comprises any of a target parameter indicating traffic in the particular interest area, a predetermined time period parameter for setting the state of the at least one switch, a frequency count parameter within the predetermined time period, and a repetition parameter indicating a repetition of the predetermined time period.

9. The method according to claim 8, wherein the applying step further comprises steps of:

analyzing, by an analyzing processor, the data according to the at least one parameter of the at least one predetermined rule; and setting, by a state setting processor, the state of the at least one switch within the user database to reflect the anticipated interest of the user.

10. The method according to claim 1, further comprising steps of:

receiving, by a receiving processor, a request for the anticipated interests data and user-specified preferences associated with the user and stored in a user database;

when the anticipated interests data are available in the user database, retrieving the anticipated interests data;

when the user-specified preferences are available in the user database, retrieving the user-specified preferences; and transmitting, by a transmitting processor, the retrieved anticipated interests data and the retrieved user-specified preferences for further predication of a set of personalized services to be displayed for the user.

11. The method according to claim 10, wherein the anticipated interests data and the user-specified preferences are used to create a personalized user interface area containing at least one content window, each window including access to an entity preferred by the user.

12. The method according to claim 1, further comprising steps of:

receiving, by a receiving processor, a request for the anticipated interests data and user-specified preferences associated with the user and stored in a user database;

when the anticipated interests data are not available in the user database, receiving the anticipated interests data collected and processed in real-time; and transmitting, by a transmitting processor, the retrieved anticipated interests data and the user-specified preferences for further predication of a set of personalized services to be displayed for the user.

* * * * *